(12) United States Patent
Yu et al.

(10) Patent No.: US 8,937,993 B2
(45) Date of Patent: Jan. 20, 2015

(54) CREST FACTOR REDUCTION FOR BRAND-LIMITED MULTI-CARRIER SIGNALS

(71) Applicant: Scintera Networks LLC, Wilmington, DE (US)

(72) Inventors: Qian Yu, Santa Clara, CA (US); Yan Wang, Sunnyvale, CA (US); Rajeev Krishnamoorthy, Saratoga, CA (US)

(73) Assignee: Scintera Networks LLC, Wilmington, DE (US)

( * ) Notice: Subject to any disclaimer, the term of this patent is extended or adjusted under 35 U.S.C. 154(b) by 0 days.

(21) Appl. No.: 13/897,119

(22) Filed: May 17, 2013

(65) Prior Publication Data

US 2014/0341316 A1 Nov. 20, 2014

(51) Int. Cl.
*H03H 7/30* (2006.01)
*H04B 1/10* (2006.01)
*H04B 1/04* (2006.01)

(52) U.S. Cl.
CPC .................................. *H04B 1/0475* (2013.01)
USPC .......................................... 375/232; 375/350

(58) Field of Classification Search
CPC ............ H04L 27/2624; H04L 27/2614; H04L 25/03834; H04L 25/0202
USPC .......................... 375/260, 296, 297, 350, 232
See application file for complete search history.

(56) References Cited

U.S. PATENT DOCUMENTS

| | | | |
|---|---|---|---|
| 7,095,798 B2 | 8/2006 | Hunton | |
| 7,170,952 B2 | 1/2007 | Hunton | |
| 8,295,394 B1 | 10/2012 | Broadwell et al. | |
| 2002/0197970 A1* | 12/2002 | Jian et al. | 455/245.2 |
| 2004/0234006 A1* | 11/2004 | Leung | 375/316 |
| 2008/0130789 A1* | 6/2008 | Copeland et al. | 375/297 |
| 2012/0320948 A1* | 12/2012 | McGowan et al. | 375/133 |
| 2013/0022148 A1* | 1/2013 | Sagi et al. | 375/296 |
| 2013/0089169 A1* | 4/2013 | Batruni | 375/350 |

OTHER PUBLICATIONS

U.S. Appl. No. 14/166,422, filed Jan. 28, 2014, Yu et al.

* cited by examiner

*Primary Examiner* — Don N Vo

(57) ABSTRACT

A crest factor reduction (CFR) circuit reduces the peak-to-average (PAR) power of a digitally modulated signal in a complex baseband is achieved by post-processing the input signal, with negligible increase in out-of-band emissions. The CFR circuit takes advantage of a procedure that solves for an optimum CFR using a constraint-optimization approach. In one embodiment, the CFR circuit, which receives an input signal and provides an output signal, includes: (a) an error generation circuit that receives the input signal and provides an error signal representative of a measure of circuit-induced distortion and a delayed input signal, the delayed input signal being the input signal delayed by a predetermined value; (b) a linear-phase filter receiving the error signal to provide a correction signal; and (c) a summer that subtracts the correction from the delayed input signal to provide the output signal. This circuit can achieve near optimal CFR for arbitrary multi-carrier signals without incurring high computational complexity.

35 Claims, 9 Drawing Sheets

TWO-STAGE CASCADED CFR

CREST FACTOR REDUCTION BY FILTERED ERROR CANCELLATION

*Fig. 1*

ERROR GENERATION FOR THE OPTIMUM CFR IN THEORY

MODIFIED CLIP-FILTER METHOD (PRIOR ART)

Fig. 4

Fig. 7
TWO-STAGE ERROR GENERATION SUBSYSTEM FOLLOWED BY FILTERED ERROR

Fig. 8
THREE-STAGE ERROR GENERATION SUBSYSTEM

CREST FACTOR REDUCTION FOR BRAND-LIMITED MULTI-CARRIER SIGNALS

BACKGROUND OF THE INVENTION

1. Field of the Invention

The present invention relates to signal processing. In particular, the present invention relates to applying crest factor reduction techniques to a digitally modulated signal used in communication application.

2. Discussion of the Related Art

The crest factor of a modulated signal is the square root of the signal's peak-to-average power ratio (PAR). Signals with large crest factor are widely used in communication systems. In many 4G/4G communication systems (e.g. WCDMA or LTE), when seen in the frequency domain, the signal band is divided into a number of non-overlapping sub-bands or carrier signals, with each carrier signal having its own multiple-access modulation format. The sampling rate of the signal is typically higher than the Nyquist rate, i.e. the signal's double-side bandwidth. In such systems, crest factor reduction (CFR) improves power efficiency in a wireless transmitter.

In the prior art, various CFR methods have been developed. However, many of these methods require modifications of either the data symbols used or the modulation schemes. Such methods are unsuitable for post-processing multi-carrier modulated signals for CFR, because the data symbols and modulation details are not available for the CFR processor.

One method that is suitable for multi-carrier signals is known as the "windowing method." However, the windowing method performs poorly due to fundamental drawbacks in the algorithm.

Figure 13:
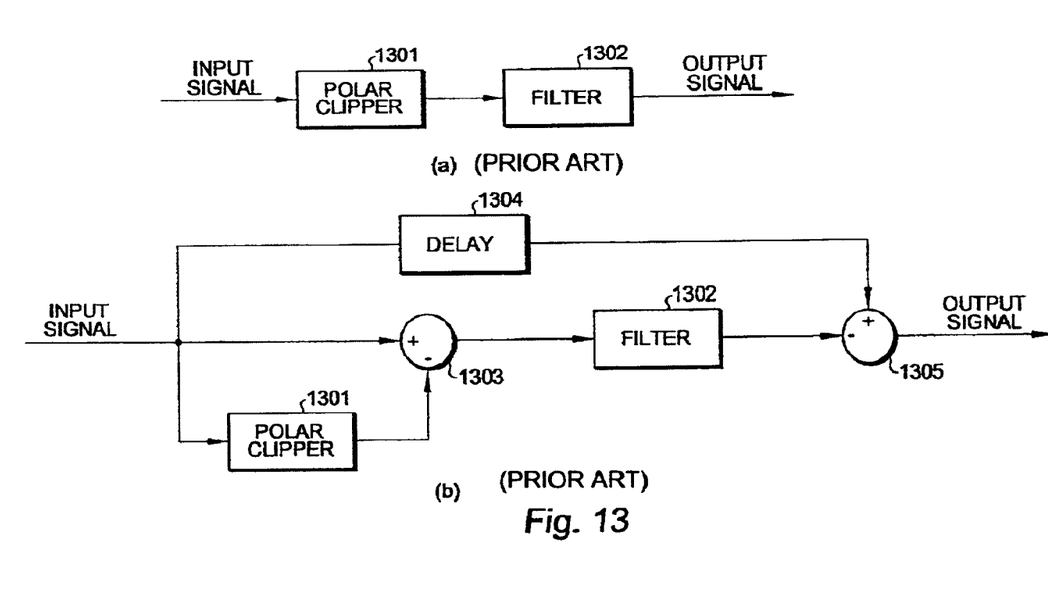

FIG. 13 (a) illustrates the "clip-filter" method for CFR in the prior art. As shown in FIG. 13(a), an input signal is polar clipped in polar clipper 1301. In a polar clipper, without changing the signal phase, the signal is either clipped, if the signal power is greater than a certain threshold, or amplified with unity gain. The clipped signal is then filtered by filter 1302, which is required to have a flat magnitude response within the signal band to avoid changing the carrier-power profile. The flat magnitude response requirement renders the method not suitable for unbalanced multi-carrier signals, because low-power carriers suffer more error-vector-magnitude (EVM) degradation than high-power carriers.

FIG. 13 (b) illustrates a modified clip-filter method in the prior art. This modified clip-filter method, which can be used with unbalanced multi-carrier signals, is described in U.S. Pat. Nos. 7,170,952 and 7,095,798, for example. However, the finite impulse response (FIR) filters required for this method typically involve a large number of taps. Such filters consume high power and require large silicon areas in a conventional FIR design. As the performance of a single-stage clip filter is limited, CFR performance can be improved by cascading multiple clip filter stages. The improvement, however, increases slowly with each additional stage, which makes it difficult to achieve the desired performance under real-world constraints on power consumption and chip area.

Other types of methods that are widely used are the "peak cancellation" methods which use a number of pulse generators to create a cancellation signal. Peak cancellation methods have two drawbacks. First, such methods result in circuits that have high power consumption requirements, due to their computational complexity. For example, the GC1115 integrated circuit marketed by Texas Instrument, Inc. has a peak power consumption of 1.8 watts. Second, such methods result in circuits that have relatively low performance.

Achieving near optimal CFR in arbitrary multi-carrier signals without incurring high computational complexity is highly desired.

SUMMARY

According to one embodiment of the present invention, a crest factor reduction (CFR) scheme for a digitally modulated signal in a complex baseband is achieved by postprocessing the input signal. The present invention provides a digital CFR processor that reduces the signal's peak-to-average power (PAR) ratio with none or minimal increase in out-of-band emissions.

The present invention takes advantage of a procedure that solves for an optimum CFR using a constraint-optimization approach. In this approach, the CFR-induced distortion is measured using a weighted mean square error (MSE) adapted for use with arbitrary multi-carrier signals. The optimum CFR results from a procedure that either minimizes the crest factor, subject to a constraint on the weighted MSE, or minimizes the weighted MSE subject to constraint on the crest factor. In this regard, the weighted MSE is closely correlated with the error-vector-magnitude (EVM) specification.

In one embodiment, the crest factor reduction processor, which receives an input signal and provides an output signal, includes: (a) an error generation circuit that receives the input signal and provides an error signal that is indicative of a crest factor-induced distortion and a delayed input signal, the delayed input signal being the input signal delayed by a predetermined value; (b) a linear-phase filter receiving the error signal to provide a correction signal; and (c) a summer that subtracts the correction from the delayed input signal to provide the output signal. The linear phase filter may have a frequency response that can be expressed as $A(\omega)e^{-j\omega D}$, where D is a delay of the linear phase filter, $A(\omega)$ is a non-negative real-value frequency response, and $\omega$ is the frequency variable.

In one embodiment, the error generation circuit comprises one or more error generation stages for an input signal that includes multiple carrier signals. In one implementation, each error generation stage comprises a high-pass filter, a polar-clipping-error block and a delay circuit matching the delayed input signal to a delay of the polar-clipping-error block. The high pass filter may have a frequency response that can be expressed as $[1-A(\omega)]e^{-j\omega D}$, where D is a delay of the linear phase filter, $A(\omega)$ is a non-negative real-value frequency response, and $\omega$ is the frequency variable. The polar-clipping error block may implement a non-zero, non-linear function for an input complex sample having a magnitude greater than a predetermined value.

In one embodiment, each error generation stage may include (a) a quantized error block that receives a block input signal and provides a quantized output signal; (b) an error filter that provides a filtered quantized output signal from the quantized output signal; (c) a delay element that delays the block input signal by a time period matching a delay of the error filter; and (d) a summer that subtracts the filtered quantized output signal from the delayed block input signal to provide a block output signal. The quantized error block may include comparator logic that determines whether or not each sample in the block input signal satisfies a predetermined condition, and wherein when the comparator logic determines that the predetermined condition is satisfied, a quantizer circuit is enabled to provide non-zero samples in the quantized output signal. The quantized stage may further include a non-linear gain circuit that provides a non-linear gain to the block output signal.

In one embodiment, the error filter includes: (a) a tapped delay line that receives a number of complex samples from the quantized output signal over many periods of an input clock; (b) summers that combine the complex samples received over the clock periods to provide a plurality of complex sums; (c) multipliers for multiplying the complex sums with filter coefficients to provide complex products; and (d) an output summer for summing the complex products. The summers and the multipliers operate at a higher clock rate than the input clock, such that multiple summing and multiplication operations are performed within each input clock period.

In an alternative embodiment, the error filter includes: (a) registers each provided to store a non-zero complex sample from the quantized output signal and a corresponding life time index representing a number of clock periods of the quantized output signal since the non-zero complex sample is stored into the register; (b) processing circuits that receive the non-zero complex samples and their corresponding life time indices stored in the registers; and (c) a summer for summing accumulated sums of the processing circuits to provide samples in the filtered quantized output signal. Each processing circuit may include: (a) a random access memory circuit that receive one or more of the life time indices as addresses to provide corresponding filter coefficients stored in the random access memory circuit; (b) a multiplier that receives in a predetermined order one or more of the non-zero complex samples and the corresponding filter coefficients to provide corresponding products; and (c) an accumulator for summing the corresponding products to provide an accumulated sum. Each processing circuit may be working at higher clock cycle to provide a plurality of non-zero complex samples over each clock period of the quantized output signal.

According to one embodiment, the quantized output signals of the error generation stages may be delayed and summed to provide an error signal suitable for error vector magnitude monitoring.

In one embodiment, the CFR processor is adaptive, and includes a spectrum analysis circuit for determining power spectra of the input signal, and a crest factor reduction controller that receives the power spectra to provide a set of filter coefficients for the error filter. The spectrum analysis circuit may compute fast fourier transforms. The crest factor reduction controller varies the set of filter coefficients adaptively based on the power spectra received. The crest factor reduction controller also extracts carrier-power distributions from the power spectra.

According to one embodiment of the present invention, a CFR processor is constructed that has close-to-optimum performance—as measured by the relevant PAR and EVM parameters—and low computation complexity. The low computational complexity results in digital circuit implementations that are low-power and have a relatively small footprint. For example, a method of the present invention can reduce PAR of a conventional LTE signal to 6.0 dB with 6.5% EVM, or 6.7 dB with 4.3% EVM, as compared to the performance of the CFR solution from Optichron in the prior art, which reduces that PAR to 6.7 dB, with 6.5% EVM.

The present invention is better understood upon consideration of the detailed description below in conjunction with the accompanying drawings.

BRIEF DESCRIPTION OF THE DRAWINGS

FIG. 13 (*a*) illustrates the "clip-filter" method for CFR in the prior art.

FIG. 13 (*b*) illustrates a modified clip-filter method for CFR in the prior art.

DETAILED DESCRIPTION OF THE PREFERRED EMBODIMENTS

According to one embodiment of the present invention, crest factor reduction (CFR) of a digitally modulated signal in complex baseband is achieved by post-processing of the input signal. The present invention is applicable, for example, to an input signal that, as seen in the frequency domain, has a signal band that is divided into a number of non-overlapping sub-bands or carriers, with each carrier having its own multiple-access modulation format. Such an input signal is used in, for example, WCDMA or LTE signals of 3G/4G wireless systems.

The present invention takes advantage of a procedure that solves for an optimum CFR using a constraint-optimization approach. In this approach, the CFR-induced distortion is measured using a weighted mean square error (MSE) adapted for use with arbitrary multi-carrier signals. The optimum CFR may result from a procedure that either minimizes the crest factor, subject to a constraint on the weighted MSE, or minimizes the weighted MSE subject to constraint on the crest factor. In this regard, the weighted MSE is closely correlated with the relevant EVM specification.

Figure 1:
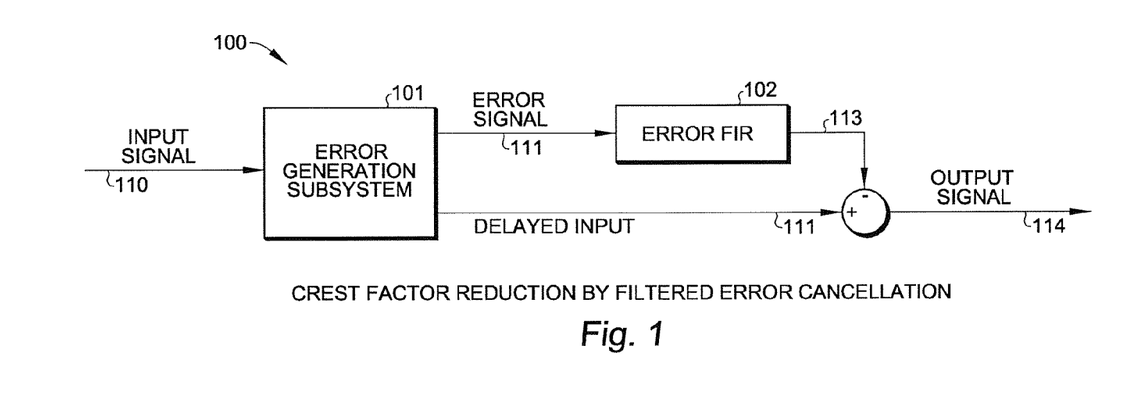
FIG. 1 is a block diagram of circuit 100 which illustrates a method that realizes an optimum CFR using a filtered error cancellation method, in accordance with one embodiment of the present invention.

FIG. 1 is a block diagram of circuit 100 which illustrates a method that realizes an optimum CFR using a filtered error cancellation method, in accordance with one embodiment of the present invention. As shown in FIG. 1, error generation subsystem 101 receives an input signal 110 and outputs both error signal 111 and delayed input signal 112, which is a delayed copy of input signal 110. Error finite impulse response filter (FIR) 102 may be a linear-phase FIR filter, whose frequency response is expressed as $A(\omega)e^{-j\omega D}$, where D is the delay of error FIR 102, $A(\omega)$ is a non-negative real-value frequency response, and $\omega$ is the frequency variable. The maximum value of $A(\omega)$ is normalized to L Delay matching allows the filtered error signal 113 to be subtracted from the delayed input signal 112 at the correct timing. Output signal 114 represents a signal with the optimum CFR.

Figure 2:
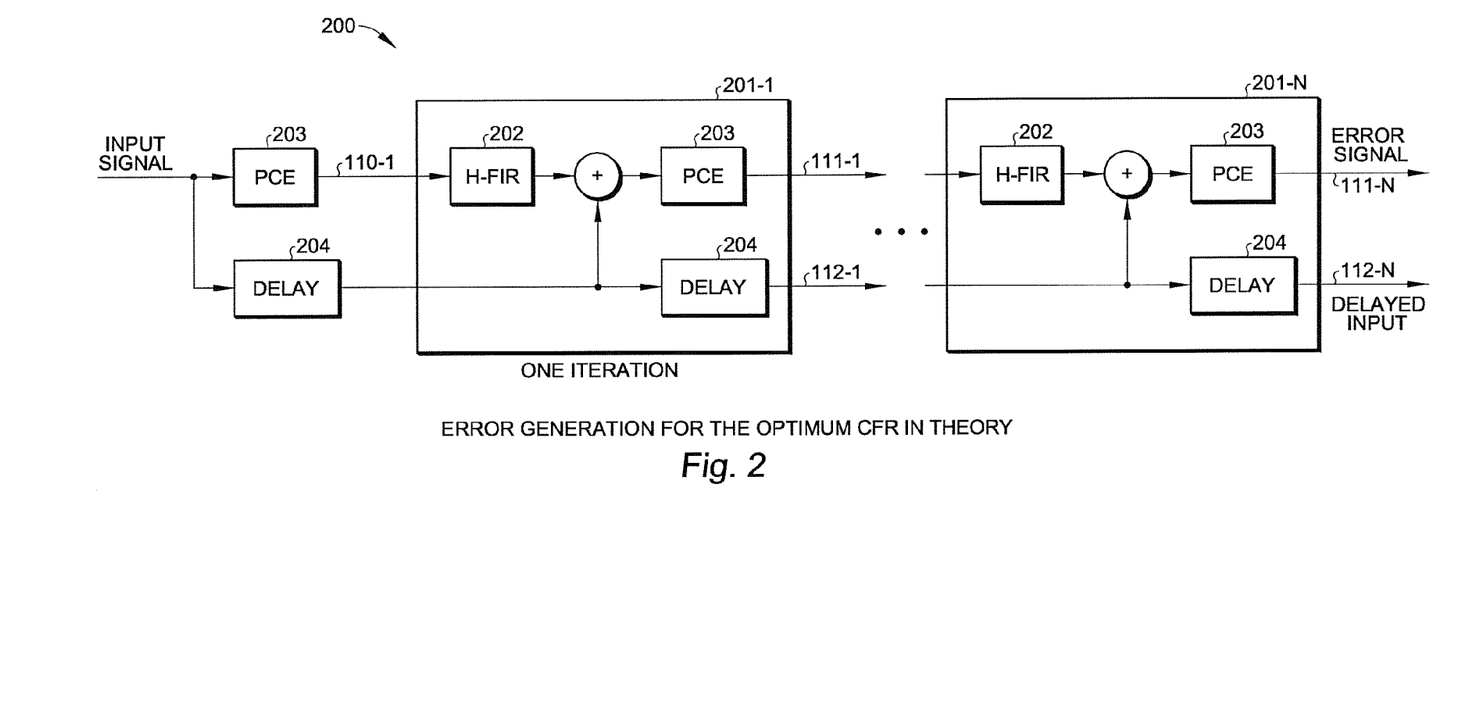
FIG. 2 is a block diagram showing circuit 200, which illustrates a method for implementing error generation subsystem 101 of FIG. 1

FIG. 2 is a block diagram showing circuit 200, which illustrates multi-stage implementation of error generation subsystem 101 of FIG. 1. As shown in FIG. 2, circuit 200 includes error generation circuit blocks 201-1 to 201-n, representing repeated applications of an error generation procedure ("error generation block 201"). In each of error generation circuit blocks 201-1 and 201-n, H-FIR block 202 represents a high-pass FIR filter with a frequency response expressed as $[1-A(\omega)]e^{-j\omega D}$, and polar-clipping-error (PCE) block 203 represents a nonlinear function expressed as $$f_{PCE}(x) = \begin{cases} 0, & \text{if } |x| \le \xi \\ x(1-\xi|x|^{-1}), & \text{if } |x| > \xi \end{cases} \quad (1)$$

where x is the input value to the $f_{PCE}$ function, typically a complex number, and $\xi$ is the threshold of polar clipping. For the error generation subsystem 101 implemented in circuit 200, delayed input signal 112 (associated with error generation block 201-n) is represented by a sequence of samples, $s=\{s_k\}$, and the error output signal 111 (also associated with block 201-n) is represented by $p=\{s_k\}$. The output error signal 111 of the multi-stage subsystem satisfies the equation $$\{p_{k-D}\}=f_{PCE}(s+H(P)) \quad (2)$$

where H denotes the function implemented by H-FIR filter 202. Repeated application of error generation blocks 201-1 and 201-n provide error signal which is used to obtain optimum CFR performance (i.e. the theoretical limit) by the method illustrated in FIG. 1.

Figure 3:
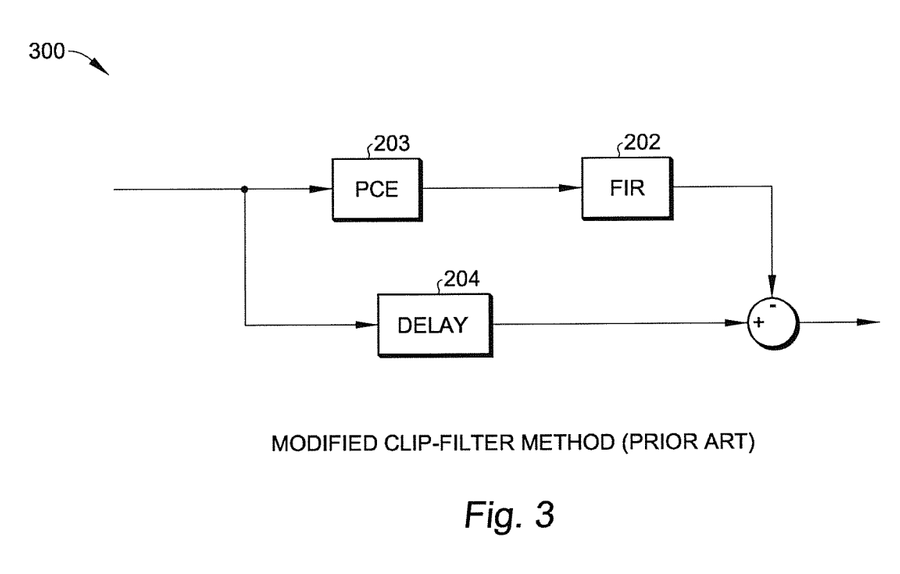
FIG. 3 shows circuit 300, which illustrates a modified clip-filter method in the prior art.

FIG. 3 shows circuit 300, which illustrates a modified clip-filter method in the prior art. Unlike circuit 200 of FIG. 2, circuit 300 of FIG. 3 does not include repeated application of the error generation procedure. Circuit 300 of FIG. 3 has relatively poor performance. Even cascading clip-filter stages of FIG. 3 improves performance very slowly with the number of clip-filter stages cascaded. Because total power consumption and required chip area both increase in proportion with the number of stages provided, sufficiently good performance under real-world constraints on power consumption and chip area is difficult. Indeed, prior art design of CFR circuits typically do not take into account power consumption in the filters.

Figure 4:
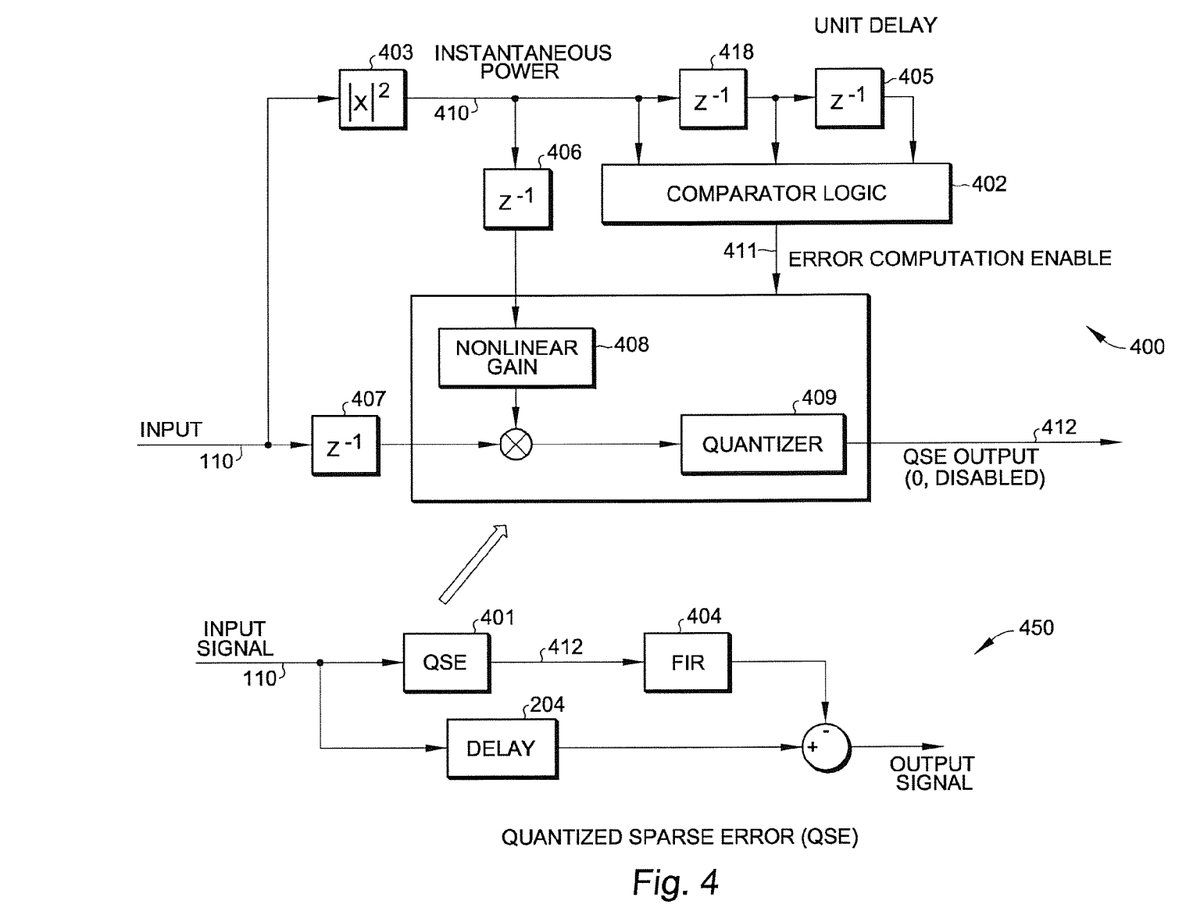
FIG. 4 shows a "CFR processor" 450, including quantized sparse error (QSE) block 400, in accordance with one embodiment of the present invention.

The present invention allows computational complexity of error generation to be reduced without incurring large degradation of CFR performance from the theoretical limit. According to one embodiment of the present invention, FIG. 4 shows a "CFR processor" 450, including quantized sparse error (QSE) block 401. A CFR processor of the present invention may be achieved by providing QSE block 4W in place of any of the PCE blocks of FIGS. 2 and 3 discussed above. FIG. 4 also shows implementation 400 of QSE block 401. As shown in FIG. 4, in implementation 400, QSE block 4W receives an input sequence of samples $\{x_k\}$ in input signal 110. Instantaneous power block 403 provides sample values that are representative of the instantaneous power of each input sample (e.g., the magnitude of each input sample or, alternatively, the square of the magnitude of each input sample). Comparator logic 402 within implementation 400 of QSE block 4W receives the instantaneous power samples and generates boolean signal 411, which values enable or disable error computation, and $b_k$ is a function of $(|x_k|,|x_{k-1}|,|x_{k-2}|)$. QSE 401 provides output sequence is $\{b_k f_Q(x_{k-1})\}$ in output signal 412, where $f_Q(x)$ is a nonlinear function expressed as $$f_Q(x) = \rho_2 \cdot \text{round}\left(\frac{x}{\rho_1} \cdot g(|x|)\right) \quad (3)$$

where $g(|x|)$ is an nonlinear gain function computed at nonlinear gain block 408 based on instantaneous power signal 410, round( ) is the rounding-to-integer function, $\rho_1$ and $\rho_2$ are quantization parameters. For example, $g(|x|)$ can be a piece-wise linear approximation of $\max(1-\xi|x|^{-1},0)$.

In one embodiment, boolean sample $b_k$ of signal 411 is given by $$b_k = \begin{cases} 1, & \text{if } |x_{k-1}| \ge \max(|x_{k-2}|,|x_k|) \text{ and } |x_{k-1}| > \xi \\ 0, & \text{otherwise} \end{cases} \quad (4)$$

and, in one implementation, nonlinear gain $g(|x|)$ is given by $$g(|x|)=\min(0.7(\log_2 |x|-\log_2 \xi),0.5) \text{ for } |x|>\xi \quad (5)$$

Some characteristics of QSE block 401 are:
1) output signal 412 is a "sparse" signal in that only a very small percentage (typically, <1%) of signal samples are non-zero values;
2) output signal 412 is coarsely quantized, as the quantization resolution parameter $\rho_1$ is a large multiple of the least-significant-bit of each of input samples $\{x_k\}$;
3) Output signal 412 has a white power spectrum; and
4) nonlinear gain $g(|x|)$ of equation (5) enhances CFR performance.

Figure 5:
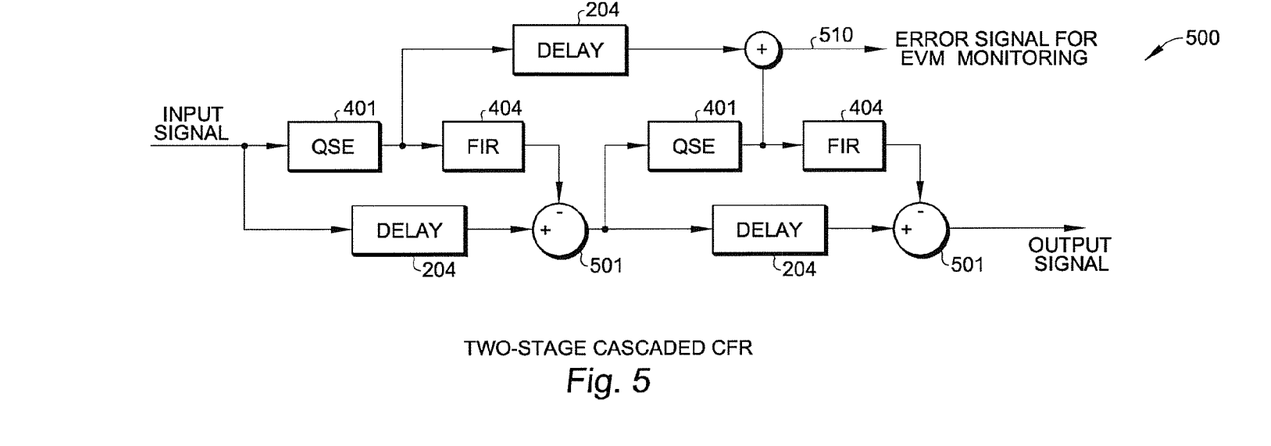
FIG. 5 is a block diagram illustrating circuit 800, which is a two-stage cascaded CFR processor, in accordance with one embodiment of the present invention.
Figure 6:
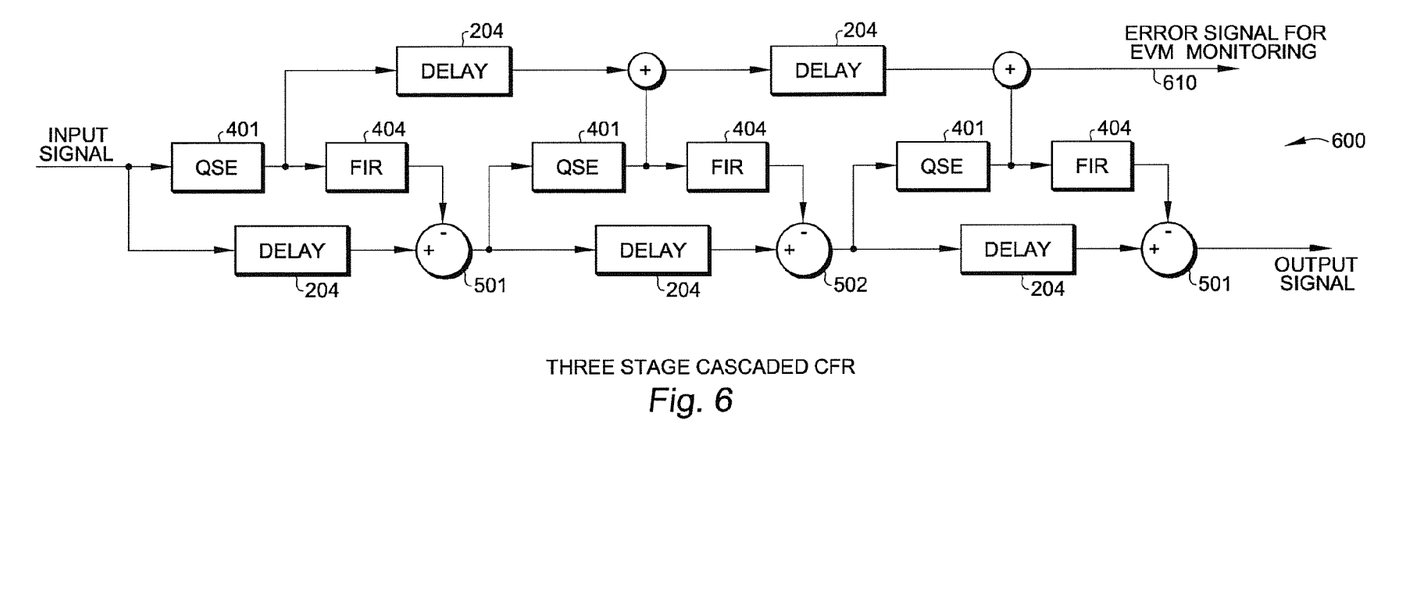
FIG. 6 is a block diagram illustrating circuit 600, which is a three-stage cascaded CFR processor, in accordance with one embodiment of the present invention.

CFR performance may be improved by cascading a number of CFR processors. Unlike a method that cascades multiple stages of PCE-based modified clip and filter, cascading 2 or 3 stages of a QSE-based CFR processor can achieve nearly optimum CFR performance (e.g., reducing the PAR to 0.1 dB higher than the theoretical limit). FIGS. 5 and 6 show two-stage and three-stage cascaded CFR processors, respectively. FIGS. 5 and 6 also each show how constructing an aggregate error signal for EVM monitoring by summed, delayed outputs of the QSE blocks.

Figure 7:
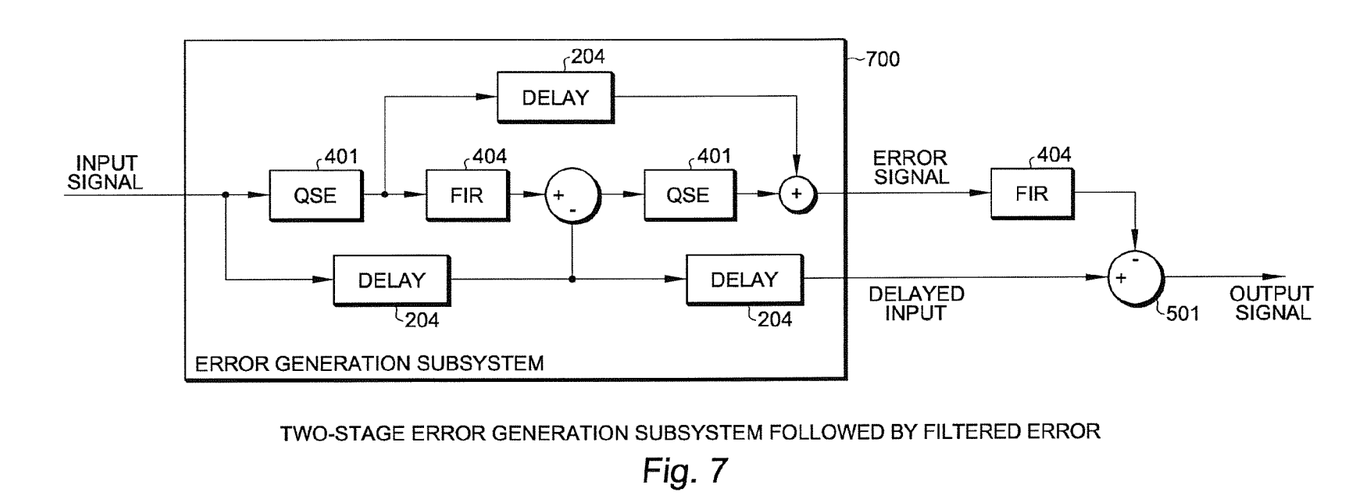
FIG. 7 is a block diagram showing two-stage error generation subsystem 700, in accordance with one embodiment of the present invention.
Figure 8:
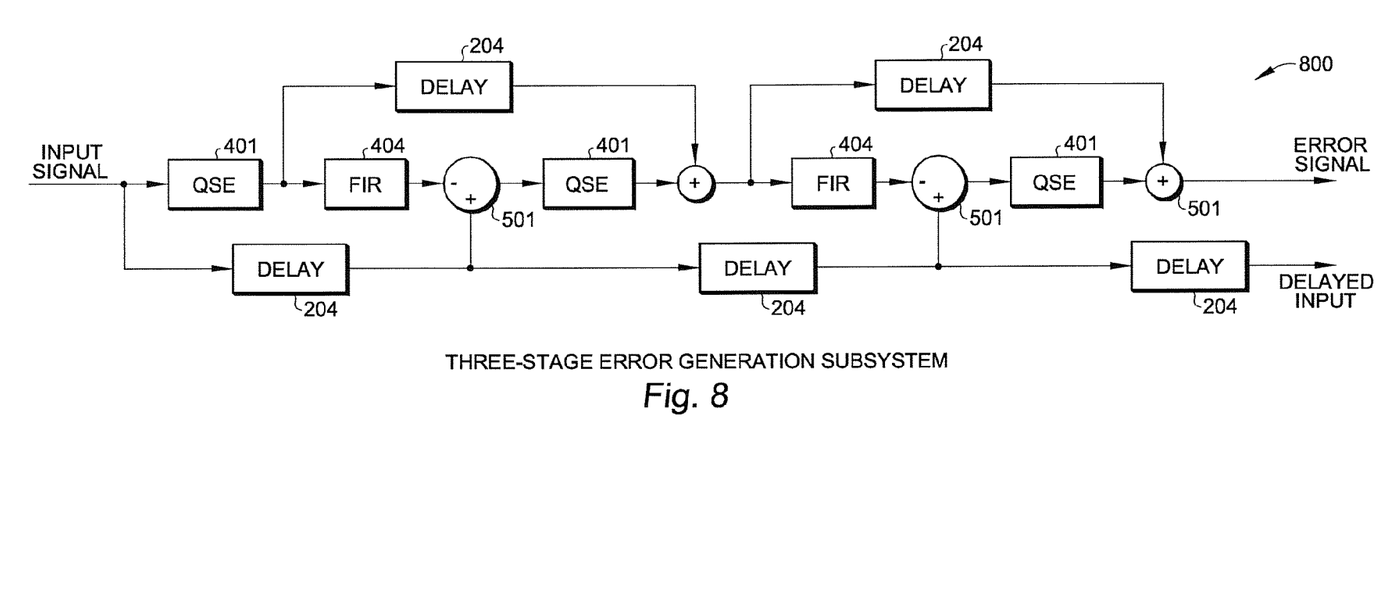
FIG. 8 is a block diagram showing three-stage error generation subsystem 800, in accordance with one embodiment of the present invention.

A cascaded-CFR processor may be used to construct a multi-stage error generation subsystem, which may then be filtered to achieve filtered error cancellation, as illustrated by FIG. 1. FIGS. 7 and 8 are block diagrams showing two-stage error generation subsystem 700 and three-stage error generation subsystem 800, respectively.

Figure 9:
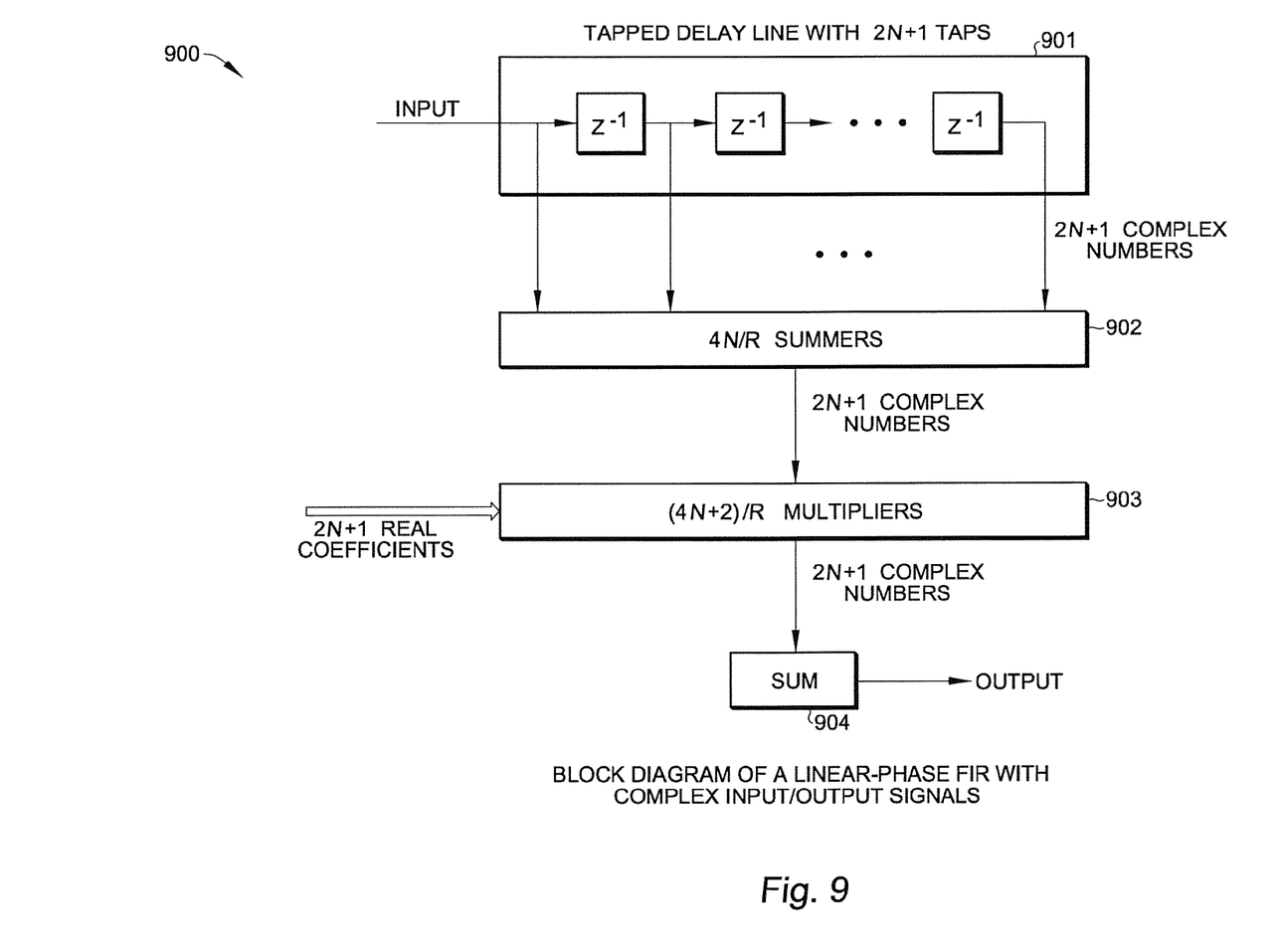
FIG. 9 shows FIR filter 900, which is a linear phase implementation of FIR 404, according to one embodiment of the present invention.

As mentioned above, because the output signal of QSE block 401 is coarsely quantized and highly sparse in the time domain, computational complexity may be reduced substantially for FIR 404 (FIG. 4) used to perform error signal filtering, relative to FIR 102 (FIG. 2), which is used to perform error signal filtering of the results of a PCE. In that regard, FIR 404 filtering the results of QSE block 4W receives input signal ($\{q_k\}$), which is a sequence of fixed-point complex numbers. The number of bits required to represent an input sample to FIR 404 may be reduced due to the coarse quantization procedure in QSE block 4W without unduly reducing system performance. FIG. 9 shows FIR filter 900, which is a linear phase implementation of FIR 404, according to one embodiment of the present invention. As shown in FIG. 9, FIR filter 900 includes tapped delay line 901 with 2N+1 taps. Tapped delay line 901 holds a vector $\{q_{k-m}\}_{n=0}^{2N}$ at each sampling time k. Linear-phase FIR 900 provides an output sequence $\{y_k\}$, which is given by:

$$y_k = \alpha_N q_{k-N} + \sum_{n=0}^{N-1} \alpha_n (q_{k-n} + q_{k+n-2N}) + j \sum_{n=0}^{N-1} \beta_n (q_{k-n} - q_{k+n-2N}) \quad (6)$$

where coefficients $\{\alpha_n\}_{n=0}^{N}$ and $\{\beta_n\}_{n=0}^{N-1}$ are fixed-point real numbers. In FIG. 9, the 2N+1 samples of tapped delay line 901 provide 4N+2 real and imaginary parts of 2N+1 complex samples from summers 902. The complex samples are multiplied with real coefficients $\{\alpha_n\}_{n=0}^{N}$ and $\{\beta_n\}_{n=0}^{N-1}$ in coefficient multipliers 903 and summed in summer 904.

Figure 10:
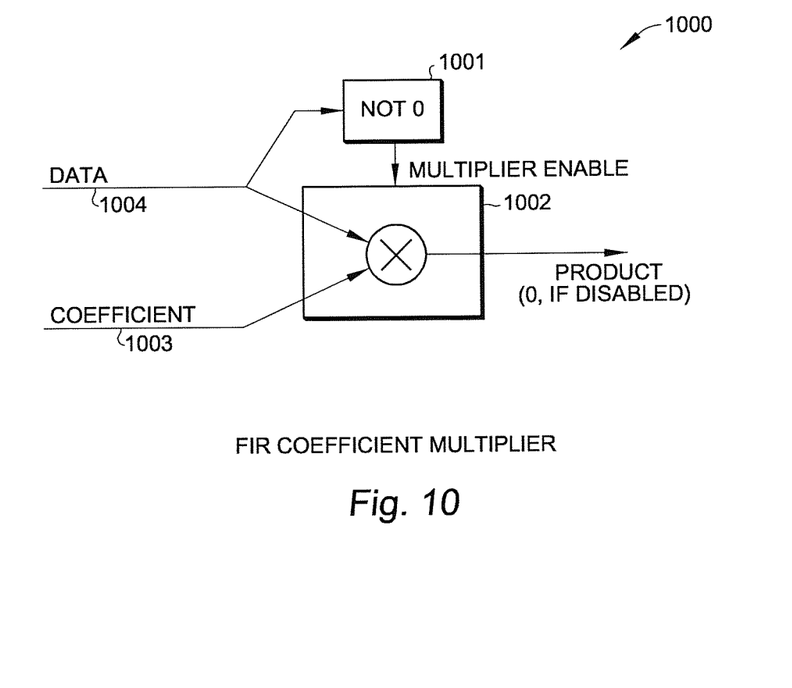
FIG. 10 shows a block diagram of multiplier 1000, which may be used to implement a multiplier in FIR coefficient multipliers 903, in accordance with one embodiment of the present invention.

Coefficient multipliers 903 of FIR filter 900 may each be designed to consume no power when its input data is zero. FIG. 10 shows a block diagram of multiplier 1000, which may be used to implement a multiplier in coefficient multipliers 903, in accordance with one embodiment of the present invention. As shown in FIG. 10, multiplier 1002 is enabled only when logic 1001 determines that input sample 1004 is non-zero. Multiplier 1002 provides the product of coefficient 1003 and input sample 1004, when input sample 1004 is non-zero, and zero, otherwise. Because the $q_k$ samples in tapped delay line 9W are mostly zero, the average power consumption of FIR 900 is greatly reduced. The number of coefficient multipliers 903 required is given by (4N+2)/R, where R is a resource reuse ratio. A digital circuit implementation can achieve R≥4, as coefficient multipliers 903 and summers 902 can work at a clock rate much higher than data rate of $\{q_k\}$.

Figure 11:
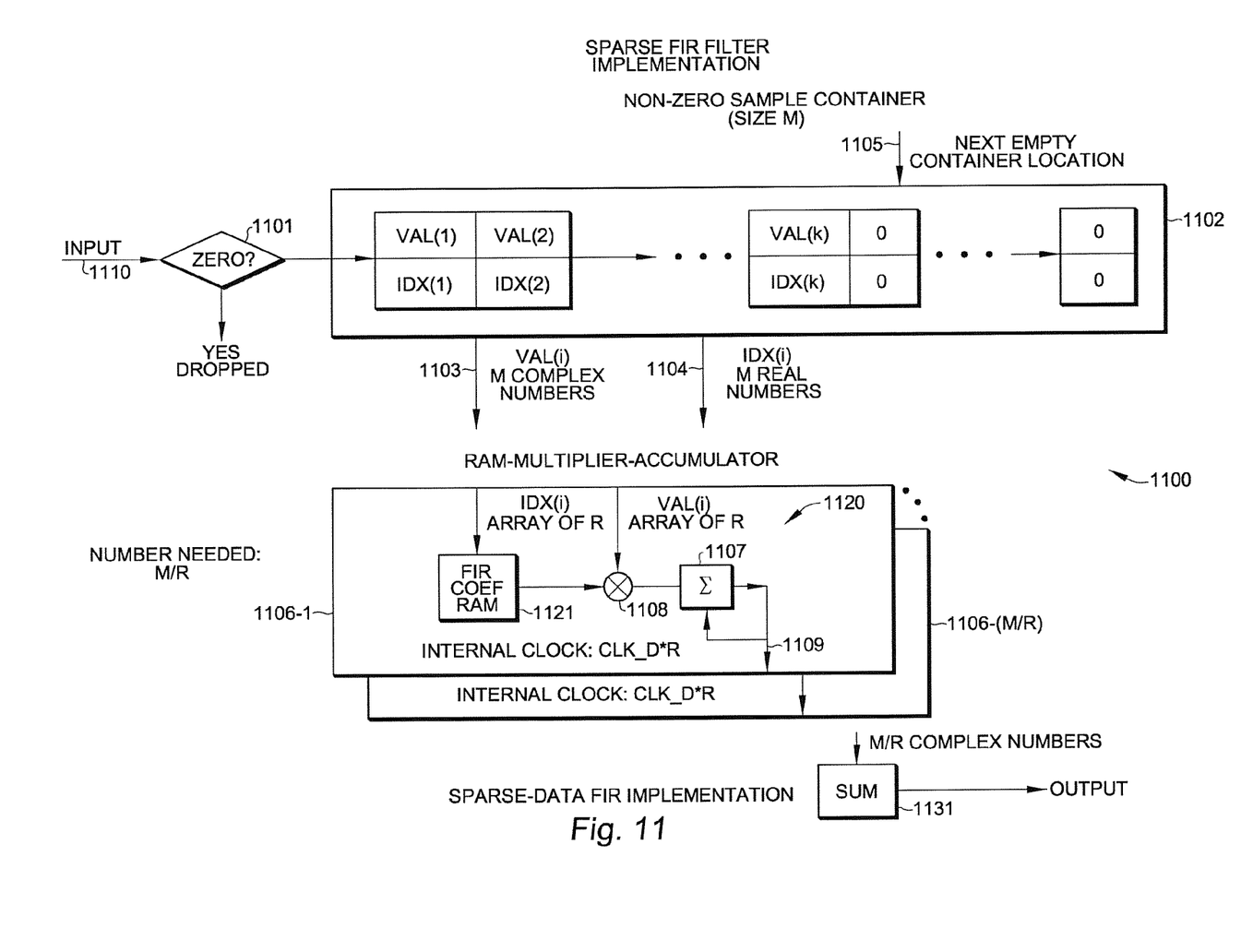
FIG. 11 shows sparse-data FIR 1100, which may be used as another implementation of FIR filter 404, in accordance with one embodiment of the present invention.

FIG. 11 shows sparse-data FIR 1100, which may be used as another implementation of FIR filter 404, in accordance with one embodiment of the present invention. As in FIR filter 900 of FIG. 9, input signal 1110 of sparse-data FIR 1100, $\{q_k\}$, is a sequence of fixed-point complex numbers. Only non-zero values in input signals 1110, as determined in logic 1101, are kept in non-zero sample container 1102. Each register in non-zero sample container 1102 holds two values: the sample value, and an associated life time index, which is assigned to zero at the time that the sample value is stored. The life time index, which is output onto index bus 1104, is used as an address to fetch FIR coefficients from a RAM table (e.g., RAM table 1121, in circuit 1120, discussed below). At each data clock, each life time index is incremented by one until 2N+1, which is the length of FIR 1100. (When 2N+1 is reached, the sample value has "expired", i.e., it is no longer relevant to output value $y_k$; see equation (6) above). When a sample value expires, the register it occupies becomes available again. A counter maintains pointer 1105, which indicates the next register that is available for a new non-zero input complex sample to be stored. Pointer 1105 advances one register, when a new input sample is stored into non-zero sample container 1102. Pointer 1105 resets to the first register, when the last register in non-zero sample container 1102 is filled.

Non-zero sample container 1102 may include M register, which is the maximum number of non-zero samples expected to appear in 2N+1 consecutive complex samples of input signal 1110 (i.e., $\{q_k\}$). With an appropriate quantization selected, non-zero sample container 1102 does not overflow. Should overflow occurs, the oldest non-zero sample in non-zero sample container 1102 is forcibly expired.

The stored input samples (i.e., up to M complex samples) and their respective life time indices are provided on data bus 1103 and index bus 1104, respectively. Each bus is further divided into M/R sets of $R_{values}$, with R being a resource reuse ratio. In other words, data base 1103 and index bus 1104 are divided into M/R sets of buses, with each set of bus containing {Val(i)} values, where i≤R, and Val(i) being a complex number, and {idx(i)} values, with i≤R, and idx(i) being an integer. Each set of buses is then fed into one of RAM-multiplier-accumulator circuits 1106-1 to 1106-(M/R). Each RAM-multiplier-accumulator circuit works at an internal clock rate that is R times of the sampling data rate of input samples $\{q_k\}$. At the beginning of each input sample clock period, accumulator 1107 is set to zero. At each internal clock period s (which is each 1/R of the input sample clock period), index idx(s) is used to fetch a FIR coefficient from RAM table 1121. The FIR coefficient is then multiplied with the corresponding Val(s) by multiplier 1108 and the result is accumulated in accumulator 1107. Therefore, at the input data clock period (i.e., at the end of R internal clock periods), each of RAM-multiplier-accumulator circuit completes R samples from non-zero sample container 1102 and provides as output a complex number. In sparse data FIR 1100, the linear-phase FIR coefficients are 2N+1 real numbers, rather than 2N+1 complex numbers. The M/R output complex values of RAM-Multiplier-accumulator circuit 1106-1 to 1106-(M/R) are then summed in sum circuit 1131 to provide value $y_k$ of sparse-data FIR filter 1100 (see equation 6).

One advantage of the present invention is the monitoring of each carrier's EVM in the output signal of the CFR processor. The error-signal output from a multi-stage error generation subsystem (e.g., any of the circuits of FIG. 2, 7 or 8) has a white power spectrum. The power spectral density (PSD) of the error signal is $E_{av}/f_s$, where $E_{av}$ is the average power of the error signal and $f_s$ the sampling rate. The power spectrum of the CFR-induced distortion is $(E_{av}/f_s)A^2(\omega)$. In the cascaded-CFR structure, one way of providing an error signal for EVM monitoring is illustrated by error signals 510 and 610 in FIG. 5 and FIG. 6, respectively. A multi-carrier signal with L carriers may be characterized by the carrier power distribution, denoted by $\{\eta_\ell\}_{\ell=1}^{L}$ $$\left(\text{where } \sum \eta_\ell = 1\right),$$

and the carrier boundary frequencies $\{f_\ell\}_{\ell=0}^{L}$. The EVM of a carrier is given by $$EVM = \sqrt{\gamma_\ell}, \quad \gamma_\ell = \frac{E_{av}}{P_{av}} \frac{1}{\eta_\ell f_s} \int_{f_{\ell-1}}^{f_\ell} A^2(2\pi f) df \quad (7)$$

where $P_{av}$ is the average power of the multi-carrier signal. The error-to-signal ratio, i.e., $E_{av}/P_{av}$, may be obtained from average power measurements.

Figure 12:
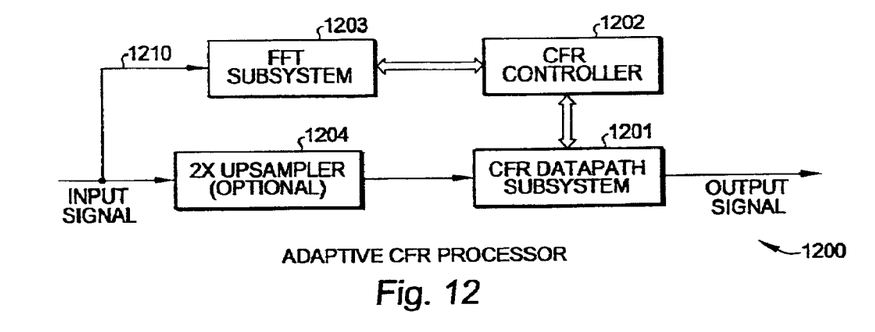
FIG. 12 is block diagram of adaptive CFR processor 1200, in accordance with one embodiment of the present invention.

FIG. 12 is block diagram of adaptive CFR processor 1200, in which CFR datapath subsystem 1201 includes a multi-stage structure illustrated above (e.g., any of the circuits shown in FIGS. 5-8). CFR controller 1202 may include a micro-controller or other circuits for accelerated computation. CFR controller 1202 generates all parameters of CFR datapath subsystem 1201 (e.g. the FIR filter coefficients). Adaptive CFR processor 1200 may receive information on the carrier-power distribution, $\{\eta_\ell\}_{\ell=1}^{L}$, which may be extracted, for example, from the power spectrum of input signal 1210. Power spectrum analysis, such as obtaining the carrier-power distribution may be performed using fast Fourier transform (FFT) subsystem 1203. The FIR's magnitude response, $A^2(\omega)$, may be adaptively adjusted accordingly. For example, to equalize the EVM of each carrier, the magnitude response may be designed to satisfy $$\frac{\int_{f_{\ell-1}}^{f_\ell} A^2(2\pi f)\,df}{\int_{-f_s/2}^{f_s/2} A^2(2\pi f)\,df} = \eta_\ell \qquad (8)$$

FFT subsystem 1203 may also be used in the computation of time-domain FIR coefficients by inverse FFT.

In one embodiment, adaptive CFR processor 1200 may include a 2× upsampler 1204. If the sampling rate of input signal 1210 is lower than twice the Nyquist rate, 2× upsampler 1204 is enabled to double the sampling rate. Otherwise, upsampling is not required. CFR datapath subsystem 1201 should operate at a sampling rate that is at least twice the Nyquist rate.

The detailed description above is provided to illustrate the specific embodiments of the present invention and is not intended to be limiting. Numerous variations and modifications within the scope of the present invention are possible. The present invention is set forth in the accompanying claims.

We claim:

1. A crest factor reduction circuit receiving an input signal and providing an output signal, comprising:
    an error generation circuit that receives the input signal and provides an error signal representative of a measure of a circuit-induced distortion, and a delayed input signal, the delayed input signal being the input signal delayed by a predetermined value;
    a linear-phase filter receiving the error signal to provide a correction signal; and
    a summer that subtracts the correction from the delayed input signal to provide the output signal; and
    wherein the error generation circuit includes a quantized sparse error (QSE) block including a comparator to generate a sparse, quantized output signal which forms the error signal, and which is applied to the linear-phase filter, the comparator determining whether or not each sample in the input signal applied to the QSE block satisfies a predetermined condition, and when the predetermined condition is satisfied provides non-zero samples in the sparse, quantized output signal.

2. The crest factor reduction circuit of claim 1, wherein the linear phase filter has a frequency response that is expressed as $A(\omega)e^{-j\omega D}$, where D is a delay of the linear phase filter, $A(\omega)$ is a non-negative real-value frequency response, and $\omega$ is the frequency variable.

3. The crest factor reduction circuit of claim 1, wherein the error generation circuit comprises one or more error generation stages.

4. The crest factor reduction circuit of claim 3, wherein the input signal includes multiple carrier signals.

5. The crest factor reduction circuit of claim 3, wherein each said error generation stage comprises a high-pass filter, a polar-clipping-error block and a delay circuit matching the delayed input signal to a delay of the polar-clipping-error block.

6. The crest factor reduction circuit of claim 5, wherein the high pass filter has a frequency response that is expressed as $[1-A(\omega)]e^{-j\omega D}$, where D is a delay of the linear phase filter, $A(\omega)$ is a non-negative real-value frequency response, and $\omega$ is the frequency variable.

7. The crest factor reduction circuit of claim 5, wherein the polar-clipping error block implements a non-zero, non-linear function for an input complex sample having a magnitude greater than a predetermined value.

8. The crest factor reduction circuit of claim 3, wherein each said error generation stage comprises:
    a quantized sparse error (QSE) block that receives as an input a block input signal from a previous one of said one or more error generation stages, and provides a sparse quantized output signal;
    an error filter that provides a filtered quantized output signal from the sparse quantized output signal;
    a delay element that delays the block input signal by a time period matching a delay of the error filter; and
    a summer that subtracts the filtered quantized output signal from the delayed block input signal to provide a block output signal. new 9. The crest factor reduction circuit of claim 8, wherein the error filter comprises:
    a tapped delay line that receives a number of complex samples from the sparse quantized output signal over a plurality of periods of an input clock;
    a plurality of summers that combine the complex samples received over the clock periods to provide a plurality of complex sums;
    a plurality of multipliers for multiplying the complex sums with a plurality of filter coefficients to provide a plurality of complex products; and
    an output summer for summing the complex products.

10. The crest factor reduction circuit of claim 9, wherein the summers and the multipliers operate at a higher clock rate than the input sampling rate, such that multiple summing and multiplication operations are performed within each input sampling period.

11. The crest factor reduction circuit of claim 8, wherein the error filter comprises:
    a plurality of registers each provided to store a non-zero complex sample from the sparse quantized output signal and a corresponding life time index representing a number of clock periods of the sparse quantized output signal since the non-zero complex sample is stored into the register;
    a plurality of processing circuits that receives the non-zero complex samples and their corresponding life time indices stored in the registers, each processing circuit comprising:
        a random access memory circuit that receive one or more of the life time indices as addresses to provide corresponding filter coefficients stored in the random access memory circuit;
        a multiplier that receives in a predetermined order one or more of the non-zero complex samples and the corresponding filter coefficients to provide corresponding products; and
        an accumulator for summing the corresponding products to provide an accumulated sum; and
    a summer for summing the accumulated sums of the processing circuits to provide samples in the filtered quantized output signal.

12. The crest factor reduction circuit of claim 11, wherein each said processing circuit is configured to provide a plurality of non-zero complex samples over each clock period of the sparse quantized output signal.

13. The crest factor reduction circuit of claim 8, wherein the sparse quantized output signals of the error generation stages are delayed and summed to provide the error signal.

14. The crest factor reduction circuit of claim 8, wherein the error signal is provided for error vector magnitude monitoring.

15. The crest factor reduction circuit of claim 8, wherein the error filter comprises a linear phase finite impulse response filter.

16. The crest factor reduction circuit of claim 1, wherein the predetermined condition is satisfied when the instantaneous power is higher than a threshold and not lower than the adjacent sample powers.

17. The crest factor reduction circuit of claim 1, wherein the comparator generates a binary output as a function of multiple consecutive samples in the block input signal.

18. The crest factor reduction circuit of claim 1, further comprising a non-linear gain circuit that provides a non-linear gain to the block output signal.

19. The crest factor reduction circuit of claim 1, wherein the quantized sparse error (QSE) block has a resolution that is a multiple of the least significant bit of a sample in the block input signal.

20. The crest factor reduction circuit of claim 1, wherein the block output signal has a substantially white power spectrum.

21. The crest factor reduction circuit of claim 1, further comprising:
   a spectrum analysis circuit for determining power spectra of the input signal; and
   a crest factor reduction controller that receives the power spectra to provide a set of filter coefficients for the error filter.

22. The crest factor reduction circuit of claim 21, wherein the spectrum analysis circuit computes fast fourier transforms.

23. The crest factor reduction circuit of claim 21, wherein the crest factor reduction controller varies the set of filter coefficients adaptively based on the power spectra received.

24. The crest factor reduction circuit of claim 21, wherein the crest factor reduction controller extracts carrier-power distributions from the power spectra.

25. An error generation stage, which comprises:
   a quantized error block that receives a block input signal and provides a quantized output signal;
   an error filter that provides a filtered quantized output signal from the quantized output signal;
   a delay element that delays the block input signal by a time period matching a delay of the error filter; and
   a summer that subtracts the filtered quantized output signal from the delayed block input signal to provide a block output signal; and
   a comparator configured in the quantized error block that determines when each sample in the block input signal satisfies a predetermined condition, and provides non-zero samples in the quantized output signal whenever said predetermined condition is satisfied.

26. The error generation stage of claim 25, wherein the predetermined condition is satisfied when the instantaneous power is higher than a threshold and not lower than the adjacent sample powers.

27. The error generation stage of claim 25, wherein the comparator logs generates a binary output as a function of multiple consecutive samples in the block input signal.

28. The error generation stage of claim 25, further comprising a non-linear gain circuit that provides a non-linear gain to the block output signal.

29. The error generation stage of claim 25, wherein the quantizer has a resolution that is a multiple of the least significant bit of a sample in the block input signal.

30. The error generation stage of claim 25, wherein the block output signal has a white power spectrum.

31. The error generation stage of claim 25, wherein the error generation stage is one of a plurality of error generation stages cascaded in a predetermined manner to process an input signal that is modulated by multiple carriers.

32. An error filter, which comprises:
   a tapped delay line that receives a number of complex samples from a quantized output signal over a plurality of periods of an input clock;
   a plurality of summers that combines the complex samples received over the clock periods to provide a plurality of complex sums;
   a plurality of multipliers for multiplying the complex sums with a plurality of filter coefficients to provide a plurality of complex products, wherein each one of the plurality of multipliers is configured to consume no power whenever a received one of the complex sums is zero; and
   an output summer for summing the complex products.

33. The error filter of claim 32, wherein the summers and the multipliers operate at a higher clock rate than the input sampling rate, such that multiple summing and multiplication operations are performed within each input sampling period.

34. An error filter, which comprises:
   a plurality of registers each provided to store a non-zero complex sample from the quantized output signal and a corresponding life time index representing a number of clock periods of the quantized output signal since the non-zero complex sample is stored into the register;
   a plurality of processing circuits that receive the non-zero complex samples and their corresponding life time indices stored in the registers, each processing circuit comprising:
      a random access memory circuit that receives one or more of the life time indices as addresses to provide corresponding filter coefficients stored in the random access memory circuit;
      a multiplier that receives in a predetermined order one or more of the non-zero complex samples and the corresponding filter coefficients to provide corresponding products; and
      an accumulator for summing the corresponding products to provide an accumulated sum; and
   a summer for summing the accumulated sums of the processing circuits to provide samples in the filtered quantized output signal.

35. The error filter of claim 34, wherein each said processing circuit is configured to provide a plurality of non-zero complex samples over each said clock period of the quantized output signal.

* * * * *

UNITED STATES PATENT AND TRADEMARK OFFICE
CERTIFICATE OF CORRECTION

PATENT NO. : 8,937,993 B2  
APPLICATION NO. : 13/897119  
DATED : January 20, 2015  
INVENTOR(S) : Qian Yu Page 1 of 1

It is certified that error appears in the above-identified patent and that said Letters Patent is hereby corrected as shown below:

Title Page:
(54) and in the Specification
Column 1, Line 2          Delete "BRAND-LIMITED" and insert --BAND-LIMITED--

In the Specification:
Column 5, Line 5          Delete "L" and insert --1.--
Column 5, Line 59         Delete "4W" and insert --401--
Column 5, Line 62         Delete "4W" and insert --401--
Column 6, Line 2          Delete "4W" and insert --401--
Column 6, Line 60         Delete "4W" and insert --401--
Column 6, Line 64         Delete "4W" and insert --401--
Column 7, Line 2          Delete "$\{q_{k-m}\}n = 0^{2N}$" and insert --$\{q_{k-n}\}n = 0^{2N}$--
Column 7, Line 28         Delete "9W" and insert --901--

In the Claims:
Column 10, Line 20, Claim 8          After "signal.", delete "new"
Column 12, Line 2, Claim 27          After "comparator", delete "logs"

Signed and Sealed this  
Twelfth Day of May, 2015

Michelle K. Lee  
*Director of the United States Patent and Trademark Office*